United States Patent
Oda et al.

(10) Patent No.: US 9,528,416 B2
(45) Date of Patent: Dec. 27, 2016

(54) EXHAUST GAS PURIFICATION APPARATUS FOR INTERNAL COMBUSTION ENGINE

(71) Applicants: Tomihisa Oda, Numazu (JP); Makoto Ogiso, Mishima (JP); Masaaki Sato, Susono (JP)

(72) Inventors: Tomihisa Oda, Numazu (JP); Makoto Ogiso, Mishima (JP); Masaaki Sato, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/762,555

(22) PCT Filed: Jan. 25, 2013

(86) PCT No.: PCT/JP2013/051596
§ 371 (c)(1),
(2) Date: Jul. 22, 2015

(87) PCT Pub. No.: WO2014/115303
PCT Pub. Date: Jul. 31, 2014

(65) Prior Publication Data
US 2015/0322839 A1    Nov. 12, 2015

(51) Int. Cl.
*F01N 3/20*    (2006.01)
*B01D 53/94*    (2006.01)
(Continued)

(52) U.S. Cl.
CPC .......... *F01N 3/208* (2013.01); *B01D 53/9431* (2013.01); *B01D 53/9477* (2013.01);
(Continued)

(58) Field of Classification Search
None
See application file for complete search history.

(56) References Cited

U.S. PATENT DOCUMENTS

2011/0192144 A1    8/2011  Yasui

FOREIGN PATENT DOCUMENTS

| DE | WO 2004076829 A1 * | 9/2004 | ......... B01D 53/9418 |
| JP | 2000-265828 | 9/2000 | |

(Continued)

OTHER PUBLICATIONS

English language translation of JP 2012-237296 dated Dec. 6, 2012.

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

The purpose is to prevent ammonia from flowing out of a NOx selective reduction catalyst when an air-fuel ratio of exhaust gas flowing into a NOx storage/reduction catalyst decreases. An NSR catalyst, a NOx sensor, and an SCR catalyst are provided in an exhaust passage in sequence from an upstream side, and a control apparatus is further provided to determine an amount of ammonia supplied to the NOx selective catalytic reduction catalyst on the basis of a detection value of the NOx sensor. When the air-fuel ratio of the exhaust gas flowing into the NOx storage/reduction catalyst is set at or below a stoichiometric air-fuel ratio, an amount of ammonia supplied from an ammonia supply apparatus relative to the detection value of the NOx sensor is decreased so as to be smaller than when the air-fuel ratio of the exhaust gas is larger than the stoichiometric air-fuel ratio.

3 Claims, 4 Drawing Sheets

(51) Int. Cl.
*F01N 3/08* (2006.01)
*F01N 9/00* (2006.01)

(52) U.S. Cl.
CPC ....... *B01D 53/9495* (2013.01); *F01N 3/0814* (2013.01); *F01N 3/0842* (2013.01); *F01N 9/00* (2013.01); *B01D 2255/904* (2013.01); *F01N 2560/026* (2013.01); *F01N 2610/02* (2013.01); *F01N 2900/1402* (2013.01); *Y02T 10/24* (2013.01); *Y02T 10/47* (2013.01)

(56) References Cited

FOREIGN PATENT DOCUMENTS

| | | |
|---|---|---|
| JP | 2008-303759 | 12/2008 |
| JP | 2009-41430 | 2/2009 |
| JP | 2011-163193 | 8/2011 |
| JP | 2012-237296 | 12/2012 |

\* cited by examiner

EXHAUST GAS PURIFICATION APPARATUS FOR INTERNAL COMBUSTION ENGINE

CROSS-REFERENCE TO RELATED APPLICATIONS

This application is a national phase application of International Application No. PCT/JP2013/051596, filed Jan. 25, 2013, the content of which is incorporated herein by reference.

TECHNICAL FIELD

The present invention relates to an exhaust gas purification apparatus for an internal combustion engine.

BACKGROUND ART

In a conventional technique, a NOx storage/reduction catalyst (referred to hereafter as an NSR catalyst) and a NOx selective reduction catalyst (referred to hereafter as an SCR catalyst) are disposed in an exhaust passage of an internal combustion engine (see Patent Document 1, for example). The NSR catalyst stores NOx contained in exhaust gas that flows into the NSR catalyst when an oxygen concentration of the inflowing exhaust gas is high, and reduces the stored NOx when the oxygen concentration of the inflowing exhaust gas is lowered and a reducing agent is present. The SCR catalyst selectively reduces the NOx using a reducing agent.

Incidentally, the SCR catalyst may be provided on a downstream side of the NSR catalyst, and an amount of reducing agent supplied to the SCR catalyst may be determined in accordance with a NOx concentration of the exhaust gas flowing into the SCR catalyst. In this type of system, a NOx sensor is provided downstream of the NSR catalyst and upstream of the SCR catalyst.

Here, when an air-fuel ratio of the exhaust gas is lowered to or below a stoichiometric air-fuel ratio in order to supply a reducing agent to the NSR catalyst, there are cases where ammonia is formed in the NSR catalyst. This ammonia is detected by the NOx sensor in a similar manner to the NOx. Hence, when the NOx stored in the NSR catalyst is reduced, a detection value of the NOx sensor is larger than an actual NOx concentration. When, at this time, the amount of reducing agent to be supplied to the SCR catalyst is determined on the basis of the detection value of the NOx sensor, an excessive amount of reducing agent may be supplied to the SCR catalyst. As a result, the reducing agent may flow out of the SCR catalyst. Moreover, an amount of consumed reducing agent may increase.

PRIOR ART REFERENCES

Patent Documents

Patent Document 1: Japanese Patent Application Publication No. 2000-265828

SUMMARY OF THE INVENTION

Problems to be Solved by the Invention

The present invention has been designed in consideration of the problem described above, and an object thereof is to prevent ammonia from flowing out of a NOx selective reduction catalyst when an air-fuel ratio of exhaust gas flowing into a NOx storage/reduction catalyst decreases.

Means for Solving the Problems

To achieve the object described above, the present invention provides an exhaust gas purification apparatus for an internal combustion engine, including:

a NOx storage/reduction catalyst, provided in an exhaust passage of the internal combustion engine, that stores NOx when an air-fuel ratio of exhaust gas is larger than a stoichiometric air-fuel ratio and that reduces the stored NOx when the air-fuel ratio of the exhaust gas is equal to or smaller than the stoichiometric air-fuel ratio;

a NOx selective reduction catalyst, provided in the exhaust passage downstream of the NOx storage/reduction catalyst, that reduces NOx using ammonia as a reducing agent;

a NOx sensor that detects concentration of NOx and ammonia in the exhaust gas in the exhaust passage downstream of the NOx storage/reduction catalyst and upstream of the NOx selective reduction catalyst;

an air-fuel ratio decrease unit that sets the air-fuel ratio of the exhaust gas flowing into the NOx storage/reduction catalyst at or below the stoichiometric air-fuel ratio;

an ammonia supply apparatus that supplies ammonia from an upstream side of the NOx selective reduction catalyst; and a control apparatus that determines an amount of ammonia supplied from the ammonia supply apparatus on the basis of a detection value of the NOx sensor, wherein when the air-fuel ratio of the exhaust gas flowing into the NOx storage/reduction catalyst is set at or below the stoichiometric air-fuel ratio by the air-fuel ratio decrease unit, the control apparatus makes the amount of ammonia supplied from the ammonia supply apparatus, relative to the detection value of the NOx sensor, less than when the air-fuel ratio of the exhaust gas is larger than the stoichiometric air-fuel ratio.

When the air-fuel ratio of the exhaust gas is set at or below the stoichiometric air-fuel ratio by the air-fuel ratio decrease unit, the NOx stored in the NOx storage/reduction catalyst (NSR catalyst) is reduced. At this time, ammonia may be formed in the NSR catalyst. This ammonia is detected by the NOx sensor in a similar manner to the NOx. Therefore, the detection value obtained by the NOx sensor at this time is larger than an actual NOx concentration. By decreasing the amount of ammonia supplied from the ammonia supply apparatus at this time, a situation in which an excessive amount of reducing agent is supplied to the NOx selective reduction catalyst (SCR catalyst) can be suppressed. More specifically, when the air-fuel ratio of the exhaust gas is equal to or smaller than the stoichiometric air-fuel ratio, the amount of ammonia supplied from the ammonia supply apparatus is decreased so as to be smaller than when the air-fuel ratio of the exhaust gas is larger than the stoichiometric air-fuel ratio, even if the detection values of the NOx sensor are the same. To lessen the amount of ammonia supplied from the ammonia supply apparatus relative to the detection value of the NOx sensor, either the detection value of the NOx sensor or the amount of ammonia supplied from the ammonia supply apparatus is corrected, for example.

According to the present invention, in other words, when the air-fuel ratio of the exhaust gas flowing into the NOx storage/reduction catalyst has is at or below the stoichiometric air-fuel ratio by the air-fuel ratio decrease unit, the control apparatus may correct the detection value of the NOx sensor.

For example, when the air-fuel ratio of the exhaust gas is equal to or smaller than the stoichiometric air-fuel ratio, a correction is performed such that the corrected NOx concentration is lower than when the NOx concentration of the air-fuel ratio of the exhaust gas is larger than the stoichiometric air-fuel ratio, even when the detection values of the NOx sensor before the correction are the same. Here, the detection value of the NOx sensor may be corrected in consideration of effects other than that of the ammonia discharged from the NSR catalyst. Even after such corrections are performed, the detection value of the NOx sensor is corrected again when the air-fuel ratio of the exhaust gas falls to or below the stoichiometric air-fuel ratio. For example, in a case where the correction is performed by multiplying the detection value of the NOx sensor by a coefficient smaller than 1, the coefficient may be decreased so as to be smaller when the air-fuel ratio of the exhaust gas is equal to or smaller than the stoichiometric air-fuel ratio than when the air-fuel ratio of the exhaust gas is larger than the stoichiometric air-fuel ratio. Alternatively, for example, the detection value of the NOx sensor may be decreased by a predetermined value when the air-fuel ratio of the exhaust gas is equal to or smaller than the stoichiometric air-fuel ratio so as to be smaller than when the air-fuel ratio of the exhaust gas is larger than the stoichiometric air-fuel ratio. By correcting the detection value of the NOx sensor in this manner, the amount of ammonia supplied from the ammonia supply apparatus at when the air-fuel ratio of the exhaust gas is equal to or smaller than the stoichiometric air-fuel ratio is decreased.

Further, according to the present invention, when the air-fuel ratio of the exhaust gas flowing into the NOx storage/reduction catalyst is set at or below the stoichiometric air-fuel ratio by the air-fuel ratio decrease unit, the control apparatus may correct the amount of ammonia supplied from the ammonia supply apparatus.

For example, when the air-fuel ratio of the exhaust gas is equal to or smaller than the stoichiometric air-fuel ratio, the ammonia supply amount may be corrected such that the amount of ammonia supplied from the ammonia supply apparatus is smaller than when the air-fuel ratio of the exhaust gas is larger than the stoichiometric air-fuel ratio, even the NOx concentrations detected by the NOx sensor are the same. Alternatively, for example, the ammonia supply amount may be decreased by a predetermined value when the air-fuel ratio of the exhaust gas is equal to or smaller than the stoichiometric air-fuel ratio so as to be smaller than when the air-fuel ratio of the exhaust gas is larger than the stoichiometric air-fuel ratio.

Furthermore, according to the present invention, the control apparatus may restrict use of the detection value of the NOx sensor at when the air-fuel ratio of the exhaust gas flowing into the NOx storage/reduction catalyst is set at or below the stoichiometric air-fuel ratio by the air-fuel ratio decrease unit.

More specifically, use of the detection value of the NOx sensor is restricted in a case where ammonia may flow out of the NSR catalyst. Restricting use of the detection value of the NOx sensor includes not using the detection value of the NOx sensor at that time. Further, the detection value of the NOx sensor may be corrected on the basis of the detection value of the NOx sensor at when the air-fuel ratio of the exhaust gas is larger than the stoichiometric air-fuel ratio. Moreover, the detection value of the NOx sensor may be considered to be 0 ppm while the air-fuel ratio is at or below the stoichiometric air-fuel ratio. In other words, the detection value of the NOx sensor may be corrected to 0 ppm. Furthermore, in a period where the air-fuel ratio is at or below the stoichiometric air-fuel ratio, a detection value of the NOx sensor before the air-fuel ratio becomes equal to or smaller than the stoichiometric air-fuel ratio may be used. In other words, while the air-fuel ratio is at or below the stoichiometric air-fuel ratio, the detection value of the NOx sensor may be corrected to the detection value obtained by the NOx sensor before the air-fuel ratio is set at or below the stoichiometric air-fuel ratio. Moreover, the detection value of the NOx sensor may be corrected to an average value of the detection value of the NOx sensor before the air-fuel ratio is set at or below the stoichiometric air-fuel ratio and the detection value of the NOx sensor at when the air-fuel ratio is at or below the stoichiometric air-fuel ratio. As a result, the detection value of the NOx sensor can be corrected easily.

Further, according to the present invention, the control apparatus may correct the detection value of the NOx sensor by calculating an amount of variation in the detection value of the NOx sensor caused by ammonia formed in the NOx storage/reduction catalyst on the basis of at least one of a value of the air-fuel ratio of the exhaust gas, a temperature of the NOx storage/reduction catalyst, and an amount of NOx stored in the NOx storage/reduction catalyst, the value, the temperature, and the amount being values at when the air-fuel ratio of the exhaust gas flowing into the NOx storage/reduction catalyst is set at or below the stoichiometric air-fuel ratio by the air-fuel ratio decrease unit, and by subtracting the amount of variation from the detection value of the NOx sensor.

In other words, when the detection value of the NOx sensor varies due to ammonia flowing out of the NSR catalyst, the detection value is corrected by removing the variation caused by the ammonia from the detection value. The amount of ammonia formed in the NSR catalyst varies in accordance with the value of the air-fuel ratio of the exhaust gas, the temperature of the NSR catalyst, and the amount of NOx stored in the NSR catalyst, and therefore the detection value of the NOx sensor can be corrected in accordance with these values. Note that the detection value of the NOx sensor may be corrected by calculating the amount of ammonia formed in the NSR catalyst, and calculating the variation in the detection value of the NOx sensor corresponding to the ammonia amount.

Furthermore, according to the present invention, the control apparatus may correct the amount of ammonia supplied from the ammonia supply apparatus by calculating an amount of ammonia formed in the NOx storage/reduction catalyst on the basis of at least one of a value of the air-fuel ratio of the exhaust gas, a temperature of the NOx storage/reduction catalyst, and an amount of NOx stored in the NOx storage/reduction catalyst, the value, the temperature, and the amount being values at when the air-fuel ratio of the exhaust gas flowing into the NOx storage/reduction catalyst is set at or below the stoichiometric air-fuel ratio by the air-fuel ratio decrease unit, and by subtracting the amount of ammonia formed in the NOx storage/reduction catalyst from the amount of ammonia supplied from the ammonia supply apparatus, the amount of ammonia supplied from the ammonia supply apparatus having been determined on the basis of the detection value of the NOx sensor.

In other words, the ammonia that flows out of the NSR catalyst is used as a reducing agent in the SCR catalyst, and therefore the amount of ammonia supplied from the ammonia supply apparatus is decreased for that. The amount of ammonia formed in the NSR catalyst varies in accordance with the value of the air-fuel ratio of the exhaust gas, the temperature of the NSR catalyst, and the amount of NOx stored in the NSR catalyst, and therefore the amount of ammonia formed in the NSR catalyst can be calculated in accordance with these values.

Effect of the Invention

According to the present invention, ammonia can be prevented from flowing out of the NOx selective reduction catalyst when the air-fuel ratio of the exhaust gas flowing into the NOx storage/reduction catalyst decreases.

MODES FOR CARRYING OUT THE INVENTION

Exemplary embodiments of the invention will be described in detail below with reference to the drawings. Note, however, that unless specified otherwise, the scope of the invention is not limited only to dimensions, materials, shapes, relative arrangements, and so on of constituent components described in the embodiments.

First Embodiment

Figure 1:
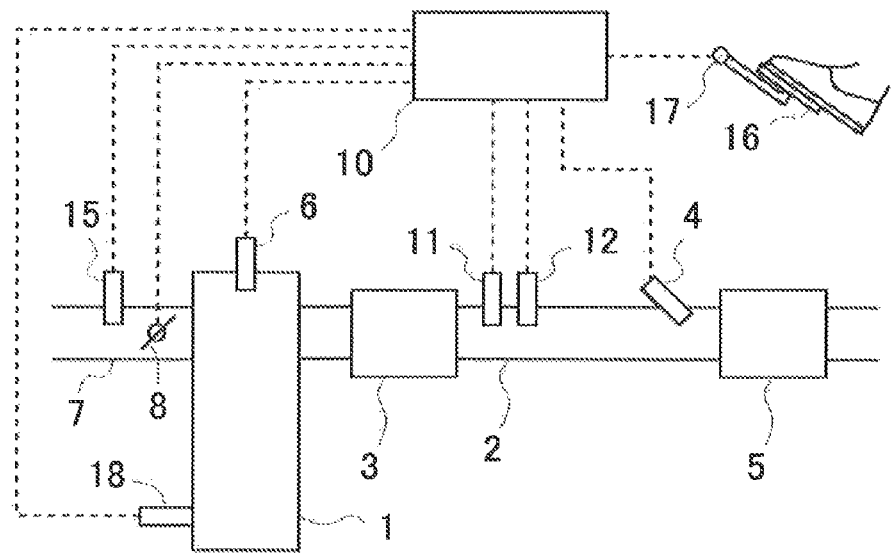
FIG. 1 is a schematic view showing a configuration of an internal combustion engine, as well as an intake system and an exhaust system thereof, according to an embodiment.

FIG. 1 is a schematic view showing a configuration of an internal combustion engine, as well as an intake system and an exhaust system thereof, according to this embodiment. An internal combustion engine 1 shown in FIG. 1 is a diesel engine, but may be a gasoline engine. The internal combustion engine 1 is installed in a vehicle, for example.

An exhaust passage 2 is connected to the internal combustion engine 1. On the way of the exhaust passage 2, a NOx storage/reduction catalyst 3 (referred to hereafter as an NSR catalyst 3), a reducing agent injection valve 4, and a NOx selective reduction catalyst 5 (referred to hereafter as an SCR catalyst 5) are provided in sequence from an upstream side.

The NSR catalyst 3 stores NOx contained in exhaust gas that flows into the NSR catalyst 3 when an oxygen concentration of the inflowing exhaust gas is high, and the NSR catalyst 3 reduces the stored NOx when the oxygen concentration of the inflowing exhaust gas is low and a reducing agent is present. HC or CO constituting unburned fuel discharged from the internal combustion engine 1 can be used as the reducing agent supplied to the NSR catalyst 3. Note that a fuel addition valve that injects fuel (HC) for the internal combustion engine 1 may be provided in the exhaust passage 2 upstream of the NSR catalyst 3, and HC may be supplied to the NSR catalyst 3 from the fuel addition valve as the reducing agent.

The SCR catalyst 5 adsorbs a reducing agent so that when NOx passes through the SCR catalyst 5, the NOx is selectively reduced by the adsorbed reducing agent. Ammonia ($NH_3$) can be used as the reducing agent supplied to the SCR catalyst 5.

The reducing agent injection valve 4 supplies the reducing agent to the SCR catalyst 5 by injecting ammonia. Note that the reducing agent injection valve 4 may inject urea water. The urea water injected by the reducing agent injection valve 4 is hydrolyzed by heat of the exhaust gas or heat from the SCR catalyst 5 so as to form ammonia, and the ammonia is adsorbed to the SCR catalyst 5. In other words, an ammonia precursor or ammonia may be supplied by the reducing agent injection valve 4. Note that in this embodiment, the reducing agent injection valve 4 corresponds to an ammonia supply apparatus of the present invention.

Further, a NOx sensor 11 that detects a NOx concentration of the exhaust gas and a temperature sensor 12 that detects a temperature of the exhaust gas are provided in the exhaust passage 2 downstream of the NSR catalyst 3 and upstream of the reducing agent injection valve 4. A temperature of the NSR catalyst 3 or a temperature of the SCR catalyst 5 can be calculated on the basis of a detection value of the temperature sensor 12. Alternatively, the detection value of the temperature sensor 12 may be set as the temperature of the NSR catalyst 3 or the SCR catalyst 5. The temperature of the NSR catalyst 3 or the SCR catalyst 5 may also be estimated on the basis of operational state of the internal combustion engine 1.

Furthermore, a fuel injection valve 6 that supplies fuel to the internal combustion engine 1 is attached to the internal combustion engine 1. Further, an intake passage 7 is connected to the internal combustion engine 1. A throttle 8 for adjusting an intake air amount of the internal combustion engine 1 is provided on the way of the intake passage 7. Moreover, an air flow meter 15 that detects the intake air amount of the internal combustion engine 1 is attached to the intake passage 7 upstream of the throttle 8.

An ECU 10 is annexed to the internal combustion engine 1 configured as described above, which serves as an electronic control unit for controlling the internal combustion engine 1. The ECU 10 controls the internal combustion engine 1 in accordance with the operational state of the internal combustion engine 1 and driver requirements.

In addition to the sensors described above, an accelerator opening sensor 17 that outputs an electric signal corresponding to an amount by which the driver depresses an accelerator pedal 16 and thereby detects an engine load, and a crank position sensor 18 that detects an engine rotation speed, are connected to the ECU 10 via electric wires. Output signals from the various sensors are thus input into the ECU 10.

Meanwhile, the reducing agent injection valve 4, the fuel injection valve 6, and the throttle 8 are connected to the ECU 10 via electric wires such that these devices are controlled by the ECU 10.

For instance, the ECU 10 controls the fuel injection valve 6 so that an air-fuel ratio in a cylinder reaches a target air-fuel ratio. The target air-fuel ratio is set in accordance with the operational state of the internal combustion engine 1. Note that the internal combustion engine 1 according to this embodiment is normally operated at a lean air-fuel ratio. During a high load operation or the like, however, the internal combustion engine 1 may be operated in the vicinity of the stoichiometric air-fuel ratio. The internal combustion engine 1 may also be operated at or below the stoichiometric air-fuel ratio in order to reduce the NOx stored in the NSR catalyst 3.

Here, the ECU 10 performs processing to reduce the NOx stored in the NSR catalyst 3. To reduce the NOx stored in the NSR catalyst 3, the ECU 10 performs a so-called rich spike, in which the air-fuel ratio of the exhaust gas flowing into the NSR catalyst 3 is decreased to a predetermined rich air-fuel ratio by adjusting an amount of fuel injected by the fuel injection valve 6 or an opening of the throttle 8. Note that in this embodiment, the ECU 10 that performs the rich spike corresponds to an air-fuel ratio decrease unit of the present invention.

The rich spike is executed when an amount of NOx stored in the NSR catalyst 3 reaches a predetermined amount, for example. The amount of NOx stored in the NSR catalyst 3 is calculated by integrating a difference between an amount of NOx flowing into the NSR catalyst 3 and an amount of NOx flowing out of the NSR catalyst 3, for example. The amount of NOx flowing into the NSR catalyst 3 and the amount of NOx flowing out of the NSR catalyst 3 can be detected by attaching sensors. The amount of NOx stored in the NSR catalyst 3 may also be calculated from the amount of NOx flowing into the NSR catalyst 3 and an estimated value of a NOx purification ratio of the NSR catalyst 3. Further, the rich spike may be executed at intervals of a predetermined time or a predetermined travel distance. Furthermore, the amount of NOx stored in the NSR catalyst 3 may be determined using a known technique.

Moreover, the ECU 10 supplies ammonia from the reducing agent injection valve 4 at predetermined time intervals. The ECU 10 calculates an amount of NOx flowing into the SCR catalyst 5 on the basis of the detection value of the NOx sensor 11, and determines an amount of ammonia to be supplied from the reducing agent injection valve 4 on the basis of the calculated NOx amount. The amount of NOx flowing into the SCR catalyst 5 is calculated on the basis of the NOx concentration detected by the NOx sensor 11 and a flow rate of the exhaust gas. The flow rate of the exhaust gas is calculated on the basis of the intake air amount detected by the air flow meter 15 and the amount of fuel supplied from the fuel injection valve 6. The ECU 10 then supplies an amount of ammonia required to reduce all of the NOx flowing into the SCR catalyst 5 from the reducing agent injection valve 4. In other words, the ECU 10 prevents an ammonia deficiency from occurring in the SCR catalyst 5 by replenishing the ammonia consumed to reduce the NOx.

Incidentally, the NOx sensor 11 detects the ammonia in a similar manner to the NOx. Further, when the rich spike is executed, NOx and ammonia are discharged from the NSR catalyst 3. The ammonia discharged from the NSR catalyst 3 serves as a reducing agent in the SCR catalyst 5. However, the detection value of the NOx sensor 11 increases due to the ammonia discharged from the NSR catalyst 3, and therefore, when the amount of ammonia supplied from the reducing agent injection valve 4 is determined on the basis of the detection value of the NOx sensor 11, the amount of ammonia in the SCR catalyst 5 becomes excessive.

According to this embodiment, therefore, the detection value of the NOx sensor 11 is corrected when the rich spike is executed. The amount of ammonia injected from the reducing agent injection valve 4 is then determined on the basis of the corrected detection value. Note that the rich spike is executed when the air-fuel ratio of the exhaust gas discharged from the internal combustion engine 1 falls to or below the stoichiometric air-fuel ratio. At this time, the air-fuel ratio of the exhaust gas that flows out of the NSR catalyst 3 likewise falls to or below the stoichiometric air-fuel ratio. Note that in this embodiment, the ECU 10 that corrects the detection value of the NOx sensor 11 corresponds to a control apparatus of the present invention. Further, in the correction performed when the rich spike is executed, the detection value of the NOx sensor 11 may be modified such that the detected NOx concentration is lower than the detected NOx concentration obtained in a correction performed when the rich spike is not executed. In other words, the detection value of the NOx sensor 11 is corrected so that the corrected detection value in the case where the rich spike is executed becomes smaller than the detection value in the case where the rich spike is not executed even if the detection values of the NOx sensor 11 before correction are the same. The detection value of the NOx sensor 11 may already have been corrected in consideration of effects other than that of the ammonia discharged from the NSR catalyst 3, for example. Even in this case, the detection value of the NOx sensor 11 is further corrected when the rich spike is executed. More specifically, in a case where the correction is performed by multiplying the detected NOx concentration by a coefficient smaller than 1, the coefficient may be decreased so as to be smaller when the rich spike is executed than when the rich spike is not executed. Alternatively, for example, the detection value of the NOx sensor 11 may be decreased by a predetermined value when the rich spike is executed so as to be smaller than when the rich spike is not executed.

Note that when the rich spike is executed, or in other words when the air-fuel ratio of the exhaust gas is set at or below the stoichiometric air-fuel ratio, the detection value of the NOx sensor 11 may be corrected to 0 ppm. In so doing, the effect of the ammonia formed in the NSR catalyst 3 is eliminated. Further, when the rich spike is executed, the detection value of the NOx sensor 11 may be corrected to a detection value obtained prior to execution of the rich spike. Likewise in this case, the effect of the ammonia formed in the NSR catalyst 3 is eliminated. In this case, either a detection value of the NOx sensor 11 immediately prior to execution of the rich spike or a detection value of the NOx sensor 11 a predetermined time prior to execution of the rich spike may be used. Alternatively, a detection value detected previously by the NOx sensor 11 may be kept while the air-fuel ratio of the exhaust gas is set at or below the stoichiometric air-fuel ratio.

The detection value of the NOx sensor 11 may also be corrected to an average value of the detection values of the NOx sensor 11 before the rich spike is executed and when the rich spike is executed. In so doing, the effect of the ammonia formed in the NSR catalyst 3 is decreased. Further, the detection value of the NOx sensor 11 may be corrected by calculating an amount of variation in the detection value of the NOx sensor 11 due to the ammonia formed in the NSR catalyst 3, and subtracting the amount of variation from the detection value of the NOx sensor 11. In this case, the NOx concentration of the exhaust gas can be detected more accurately.

Figure 2:
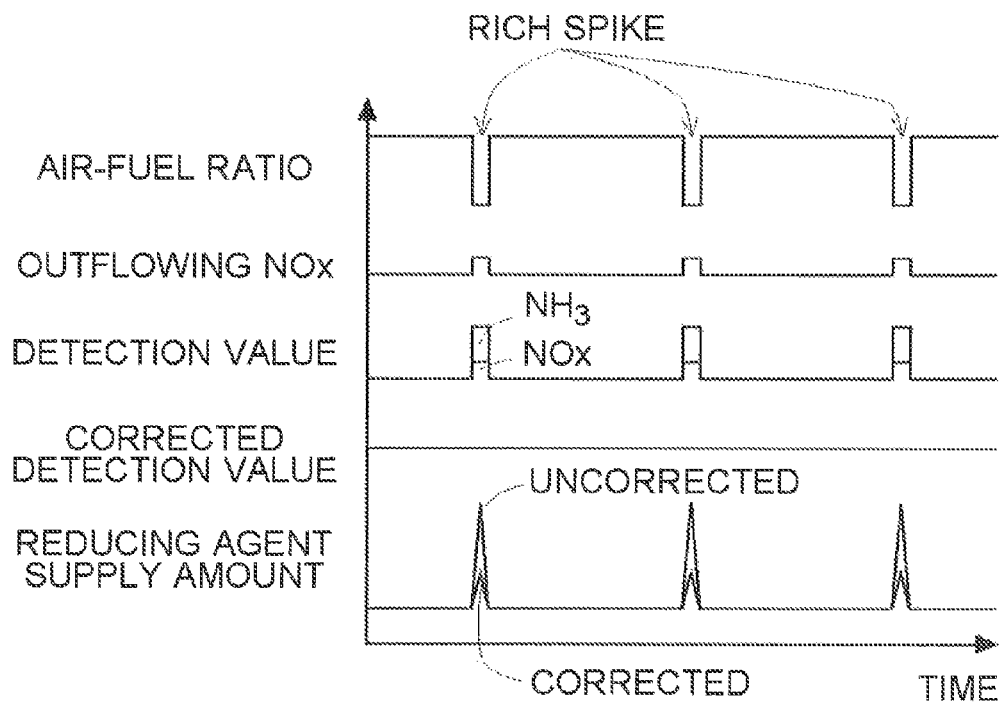
FIG. 2 is a time chart showing transitions of various values obtained when a rich spike is executed a plurality of times.

Here, FIG. 2 is a time chart showing transitions of various values when the rich spike is executed a plurality of times. FIG. 2 shows a case in which the detection value of the NOx sensor 11 when the rich spike is executed is corrected to the detection value prior to execution of the rich spike. FIG. 2 may also be considered to show a case in which the detection value of the NOx sensor 11 is corrected to 0 ppm when the air-fuel ratio of the exhaust gas is set at or below the stoichiometric air-fuel ratio.

In FIG. 2, "outflowing NOx" denotes an actual amount of NOx flowing out of the NSR catalyst 3 (which may be considered as the NOx concentration). A "detection value" denotes the detection value of the NOx sensor 11 before the correction performed by the ECU 10, the detection value being divided into variation caused by NOx and variation caused by ammonia ($NH_3$). A "corrected detection value" denotes the detection value of the NOx sensor 11 after the ECU 10 corrects the detection value of the NOx sensor 11. The corrected detection value during execution of the rich spike is identical to the detection value prior to execution of the rich spike. In other words, the corrected detection value is kept at an unvarying identical value even when the rich spike is executed. A "reducing agent supply amount" denotes the reducing agent supply amount calculated by the ECU 10 on the basis of the detection value of the NOx sensor 11, or in other words the amount of ammonia supplied from the reducing agent injection valve 4. "Corrected" denotes a case in which the ECU 10 corrects the detection value of the NOx sensor 11, and "Uncorrected" denotes a case in which the ECU 10 does not correct the detection value of the NOx sensor 11. When the ECU 10 corrects the detection value of the NOx sensor 11, the detected NOx value is smaller than when the ECU 10 does not correct the detection value, and as a result, the reducing agent supply amount decreases.

Figure 3:
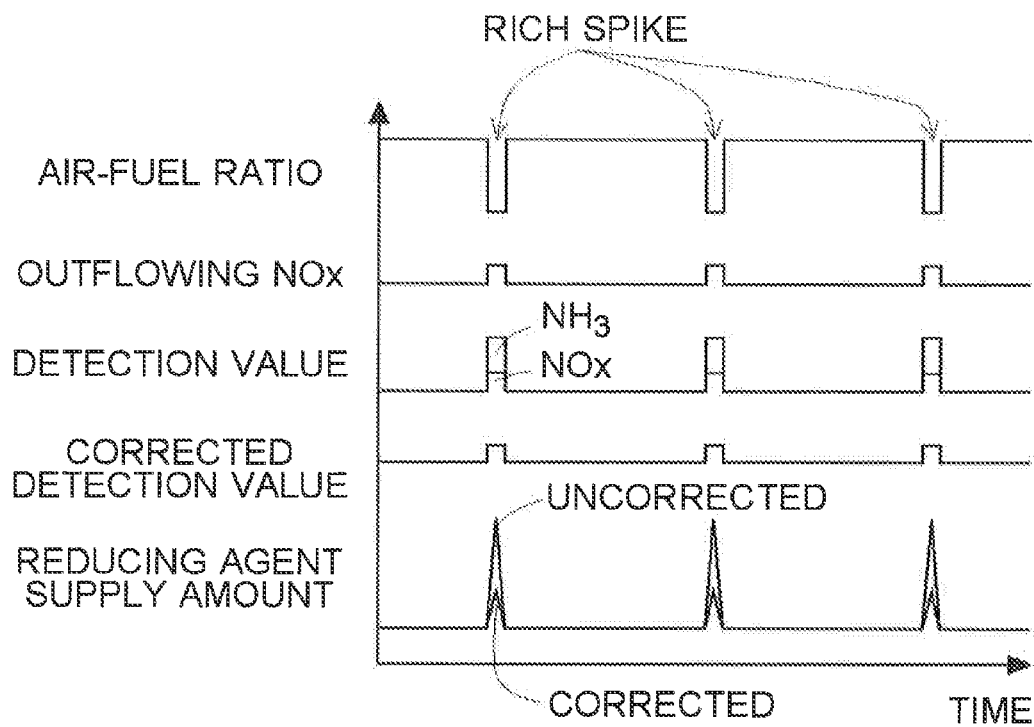
FIG. 3 is another time chart showing transitions of various values obtained when the rich spike is executed a plurality of times.

FIG. 3 is another time chart showing transitions of various values when the rich spike is executed a plurality of times. FIG. 3 shows a case in which the detection value of the NOx sensor 11 is corrected by calculating the amount of variation in the detection value of the NOx sensor 11 due to the ammonia formed in the NSR catalyst 3, and subtracting the amount of variation from the detection value of the NOx sensor 11. When the ECU 10 corrects the detection value of the NOx sensor 11, the detected NOx value is smaller than when the ECU 10 does not correct the detection value, and as a result, the reducing agent supply amount decreases.

Note that the amount of variation in the detection value of the NOx sensor 11 due to the ammonia formed in the NSR catalyst 3 can be calculated on the basis of the amount of ammonia formed in the NSR catalyst 3. Here, the amount of ammonia formed in the NSR catalyst 3 has a correlative relationship with the air-fuel ratio of the exhaust gas, the temperature of the NSR catalyst 3, and the amount of NOx stored in the NSR catalyst 3, and can therefore be calculated on the basis of at least one of these values. This relationship is determined in advance by experiments or simulations, and stored in the ECU 10 in the form of a map. Note that the amount of NOx stored in the NSR catalyst 3 may be set at a predetermined amount. An ammonia concentration of the exhaust gas can then be calculated from the amount of ammonia formed in the NSR catalyst 3 and the flow rate of the exhaust gas, whereby the amount of variation in the detection value of the NOx sensor 11 can be determined.

Instead of correcting the detection value of the NOx sensor 11, the amount of ammonia supplied from the reducing agent injection valve 4 may be corrected. In this case, in the correction performed when the rich spike is executed, the ammonia supply amount may be corrected so as to be smaller than in a correction performed when the rich spike is not executed. In other words, the ammonia supply amount is corrected so that the ammonia supply amount in the case where the rich spike is executed becomes smaller than the ammonia supply amount in the case where the rich spike is not executed, even if the detection values of the NOx sensor 11 before correction are the same. The ammonia supply amount may already have been corrected in consideration of effects other than that of the ammonia discharged from the NSR catalyst 3, for example. Even in this case, the ammonia supply amount is further corrected when the rich spike is executed. More specifically, in a case where the correction is performed by multiplying the ammonia supply amount calculated on the basis of the detection value of the NOx sensor 11 by a coefficient smaller than 1, the coefficient may be reduced so as to be smaller when the rich spike is executed than when the rich spike is not executed. Alternatively, for example, the ammonia supply amount may be reduced by a predetermined value when the rich spike is executed so as to be smaller than when the rich spike is not executed. The ammonia supply amount may also be corrected by calculating the amount of ammonia formed in the NSR catalyst 3, and subtracting the amount of ammonia formed in the NSR catalyst 3 from the ammonia supply amount calculated on the basis of the detection value of the NOx sensor 11.

Figure 4:
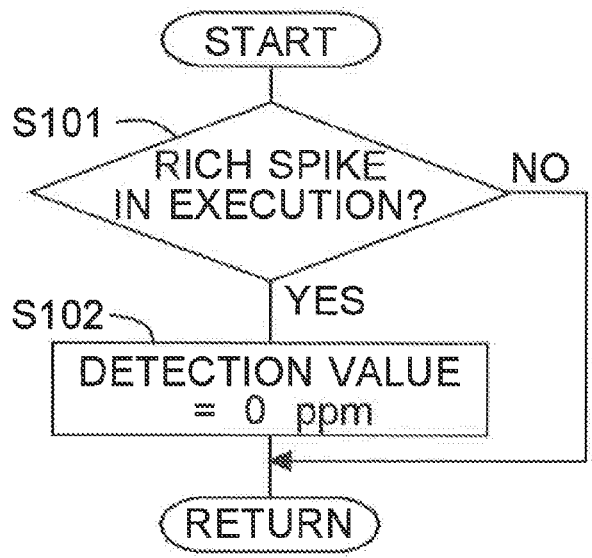
FIG. 4 is a flowchart showing a flow of control executed when the rich spike is executed.

FIG. 4 is a flowchart showing a flow of control executed when the rich spike is executed. This routine is executed by the ECU 10 repeatedly at predetermined time intervals. The predetermined time interval may be set at an interval at which ammonia is supplied from the reducing agent injection valve 4.

In step S101, a determination is made as to whether or not the rich spike is in execution. In this step, a determination is made as to whether or not the air-fuel ratio of the exhaust gas is equal to or smaller than the stoichiometric air-fuel ratio. When the determination of step S101 is affirmative, the routine advances to step S102. When the determination is negative, on the other hand, there is no need to correct the detection value of the NOx sensor 11, and therefore the routine is terminated.

In step S102, the detection value of the NOx sensor 11 is set at 0 ppm. In other words, the detection value of the NOx sensor 11 is corrected.

Figure 5:
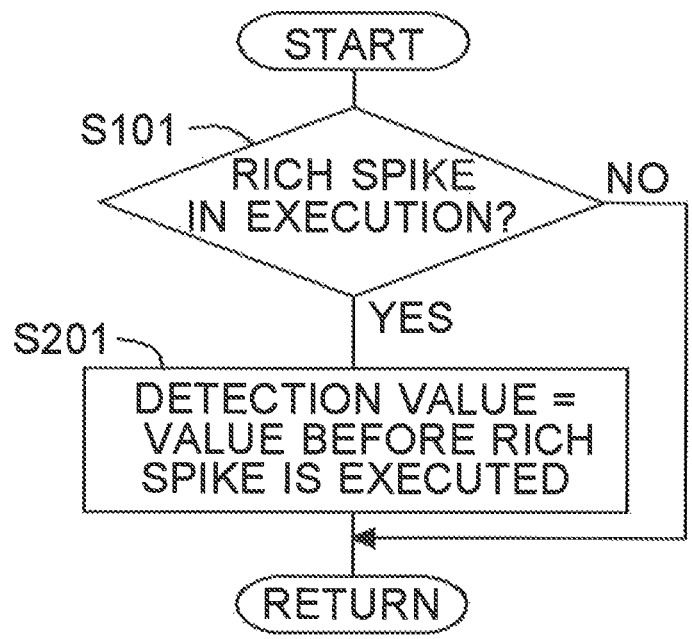
FIG. 5 is another flowchart showing a flow of control executed when the rich spike is executed.

FIG. 5 is another flowchart showing a flow of control executed when the rich spike is executed. This routine is executed by the ECU 10 repeatedly at predetermined time intervals. Steps in which identical processing to that of FIG. 4 is performed have been allocated identical step numbers, and description thereof has been omitted.

When the determination of step S101 is affirmative, the routine advances to step S201, and in step S201, the detection value of the NOx sensor 11 is set at the value before the rich spike is executed. In other words, the detection value of the NOx sensor 11 is corrected. The detection value before execution of the rich spike is the detection value just before execution of the rich spike, and is stored in the ECU 10. Note that in this step, a detection value of the NOx sensor 11 in a previous routine may be kept. In other words, when the rich spike is executed, the detection value of the NOx sensor 11 in a routine just before execution of the rich spike may be kept.

Figure 6:
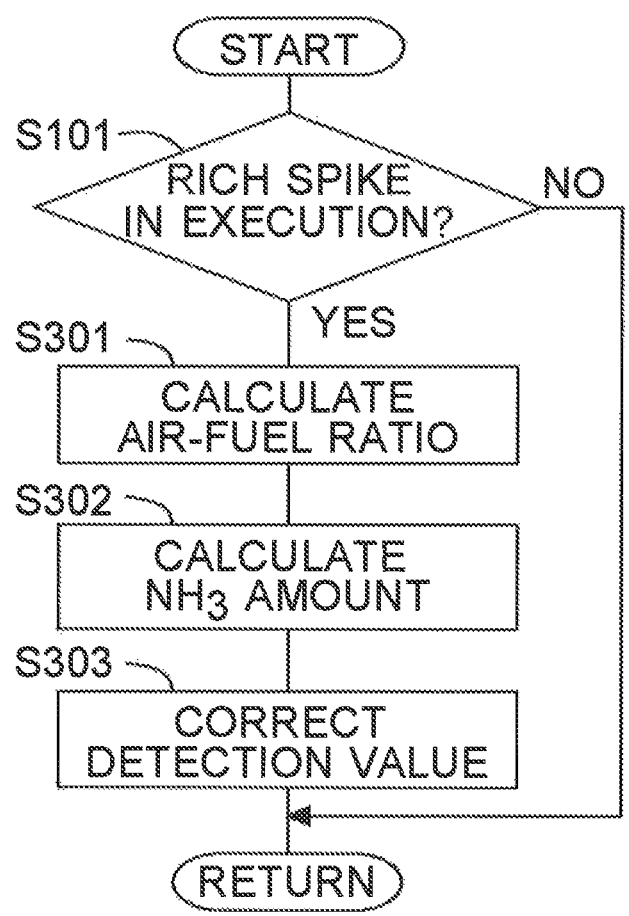
FIG. 6 is a further flowchart showing a flow of control executed when the rich spike is executed.

FIG. 6 is another flowchart showing a flow of control executed when the rich spike is executed. This routine is executed by the ECU 10 repeatedly at predetermined time intervals. Steps in which identical processing to that of FIG. 4 is performed have been allocated identical step numbers, and description thereof has been omitted.

When the determination of step S101 is affirmative, the routine advances to step S301, and in step S301, the air-fuel ratio of the exhaust gas is calculated. The air-fuel ratio of the exhaust gas may be detected using a sensor, or calculated on the basis of the intake air amount of the internal combustion engine 1 and the fuel injection amount injected by the fuel injection valve 6.

In step S302, the amount of ammonia formed in the NSR catalyst 3 is calculated. In this step, the amount of ammonia formed in the NSR catalyst 3 is calculated from the air-fuel ratio of the exhaust gas, calculated in step S301, and a map stored in advance in the ECU 10. Note that the amount of ammonia formed in the NSR catalyst 3 may be calculated while additionally taking into consideration the temperature of the NSR catalyst 3 or the amount of NOx stored in the NSR catalyst 3. Also note that in this step, a value subtracted from the detection value of the NOx sensor 11 may be calculated instead of calculating the amount of ammonia formed in the NSR catalyst 3.

In step S303, the detection value of the NOx sensor 11 is corrected by subtracting the amount of variation in the detection value of the NOx sensor 11 caused by the ammonia amount calculated in step S302 from the detection value of the NOx sensor 11. Note that in this step, the ammonia supply amount may be corrected on the basis of the ammonia amount calculated in step S302 instead of correcting the detection value of the NOx sensor 11.

According to this embodiment, as described above, by correcting the detection value of the NOx sensor 11 when a rich spike is executed, a situation in which an excessive amount of ammonia is supplied to the SCR catalyst 5 can be suppressed. As a result, ammonia can be prevented from flowing out of the SCR catalyst 5. Furthermore, an amount of consumed ammonia can be decreased.

EXPLANATION OF REFERENCE NUMERALS AND CHARACTERS 1 internal combustion engine
2 exhaust passage
3 NOx storage/reduction catalyst (NSR catalyst)
4 reducing agent injection valve
5 NOx selective reduction catalyst (SCR catalyst)
6 fuel injection valve
7 intake passage
8 throttle
10 ECU
11 NOx sensor
12 temperature sensor
15 air flow meter
16 accelerator pedal
17 accelerator opening sensor
18 crank position sensor

The invention claimed is:

1. An exhaust gas purification apparatus for an internal combustion engine, comprising:
a NOx storage/reduction catalyst, provided in an exhaust passage of the internal combustion engine, that stores NOx when an air-fuel ratio of exhaust gas is larger than a stoichiometric air-fuel ratio and reduces the stored NOx when the air-fuel ratio of the exhaust gas is equal to or smaller than the stoichiometric air-fuel ratio;
a NOx selective reduction catalyst, provided in the exhaust passage downstream of the NOx storage/reduction catalyst, that reduces NOx using ammonia as a reducing agent;
a NOx sensor that detects concentration of NOx and ammonia in the exhaust gas in the exhaust passage downstream of the NOx storage/reduction catalyst and upstream of the NOx selective reduction catalyst;
an air-fuel ratio decrease unit that sets the air-fuel ratio of the exhaust gas flowing into the NOx storage/reduction catalyst at or below the stoichiometric air-fuel ratio;
an ammonia supply apparatus that supplies ammonia from an upstream side of the NOx selective reduction catalyst; and
a control apparatus that determines an amount of ammonia supplied from the ammonia supply apparatus on the basis of a detection value of the NOx sensor,
wherein when the air-fuel ratio of the exhaust gas flowing into the NOx storage/reduction catalyst is set at or below the stoichiometric air-fuel ratio by the air-fuel ratio decrease unit, the control apparatus makes the amount of ammonia supplied from the ammonia supply apparatus, relative to the detection value of the NOx sensor, less than when the air-fuel ratio of the exhaust gas is larger than the stoichiometric air-fuel ratio, and
when the air-fuel ratio of the exhaust gas flowing into the NOx storage/reduction catalyst is set at or below the stoichiometric air-fuel ratio by the air-fuel ratio decrease unit, the control apparatus lessens the amount of ammonia supplied from the ammonia supply apparatus relative to the detection value of the NOx sensor by correcting the detection value of the NOx sensor and determining the amount of ammonia supplied from the ammonia supply apparatus on the basis of the corrected detection value of the NOx sensor.

2. The exhaust gas purification apparatus for an internal combustion engine according to claim 1, wherein that the control apparatus sets the detection value of the NOx sensor at when the air-fuel ratio of the exhaust gas flowing into the NOx storage/reduction catalyst has been set at or below the stoichiometric air-fuel ratio by the air-fuel ratio decrease unit to 0.

3. The exhaust gas purification apparatus for an internal combustion engine according to claim 1, wherein the control apparatus corrects the detection value of the NOx sensor by calculating an amount of variation in the detection value of the NOx sensor caused by ammonia formed in the NOx storage/reduction catalyst on the basis of at least one of a value of the air-fuel ratio of the exhaust gas, a temperature of the NOx storage/reduction catalyst, and an amount of NOx stored in the NOx storage/reduction catalyst, the value, the temperature, and the amount being values at when the air-fuel ratio of the exhaust gas flowing into the NOx storage/reduction catalyst is set at or below the stoichiometric air-fuel ratio by the air-fuel ratio decrease unit, and by subtracting the amount of variation from the detection value of the NOx sensor.

* * * * *